United States Patent [19]

Borja

[11] Patent Number: 4,783,958

[45] Date of Patent: Nov. 15, 1988

[54] EXHAUST GAS PROCESSING DEVICE AND METHOD

[76] Inventor: Antonio B. Borja, 2210 S. Dexter, #2, Denver, Colo. 80210

[21] Appl. No.: 912,327

[22] Filed: Sep. 29, 1986

[51] Int. Cl.$^4$ .............................................. F01N 3/04
[52] U.S. Cl. .......................................... 60/274; 55/85; 55/95; 55/233; 55/248; 55/DIG. 30; 60/310; 60/311
[58] Field of Search ............... 60/310, 311, 274; 55/DIG. 30, 85, 95, 233, 248

[56] References Cited

U.S. PATENT DOCUMENTS

| | | |
|---|---|---|
| 1,716,481 | 6/1929 | Bilsky . |
| 2,195,276 | 3/1940 | Hennessy ............................ 60/310 |
| 2,737,260 | 3/1956 | Jenison . |
| 2,787,119 | 4/1957 | Giambruno . |
| 2,932,157 | 4/1960 | Villasenor et al. . |
| 3,274,752 | 9/1966 | Huyghe et al. . |
| 3,372,540 | 3/1968 | Birdwell ............................ 60/310 |
| 3,417,549 | 12/1968 | Leosis . |
| 3,448,562 | 6/1969 | Wisting . |
| 3,541,761 | 11/1970 | Pike . |
| 3,548,591 | 12/1970 | McKay . |
| 3,618,314 | 11/1971 | Krebs ............................... 60/310 |
| 3,633,343 | 1/1972 | Mark ................................ 60/310 |
| 3,683,626 | 8/1972 | Merrill ............................. 60/310 |
| 3,712,031 | 1/1973 | Cruz ................................ 60/310 |
| 3,815,328 | 6/1974 | Moss . |
| 3,824,769 | 7/1974 | Santos et al. . |
| 4,002,136 | 1/1977 | Michalak . |
| 4,137,715 | 2/1979 | Tung-lung et al. . |
| 4,184,858 | 1/1980 | Walker ............................. 60/310 |
| 4,282,017 | 8/1981 | Chen . |
| 4,300,924 | 11/1981 | Coyle . |
| 4,578,091 | 3/1986 | Borja . |

Primary Examiner—Douglas Hart
Attorney, Agent, or Firm—Robert E. Harris

[57] ABSTRACT

An exhaust gas processing device and method are disclosed for removing particulate and other materials from hot exhaust gas while muffling operational noises produced by the system emitting the exhaust gas. The device includes first, second and third portions through which the exhaust gas is successively passed, with the first portion receiving the exhaust gas and a liquid that is vaporized to coagulate particulate matter in the gas, the second portion including filters for removing particulate material coagulated in the first portion, and a with the third portion including a liquid containing reservoir and a filter for further cleansing the gas and also heating the liquid in the reservoir, which liquid is introduced into the first portion for vaporization thereat. The device and method are particularly useful in cleaning air exhausted from an internal combustion engine that may be used, for example, to power a motor vehicle.

16 Claims, 2 Drawing Sheets

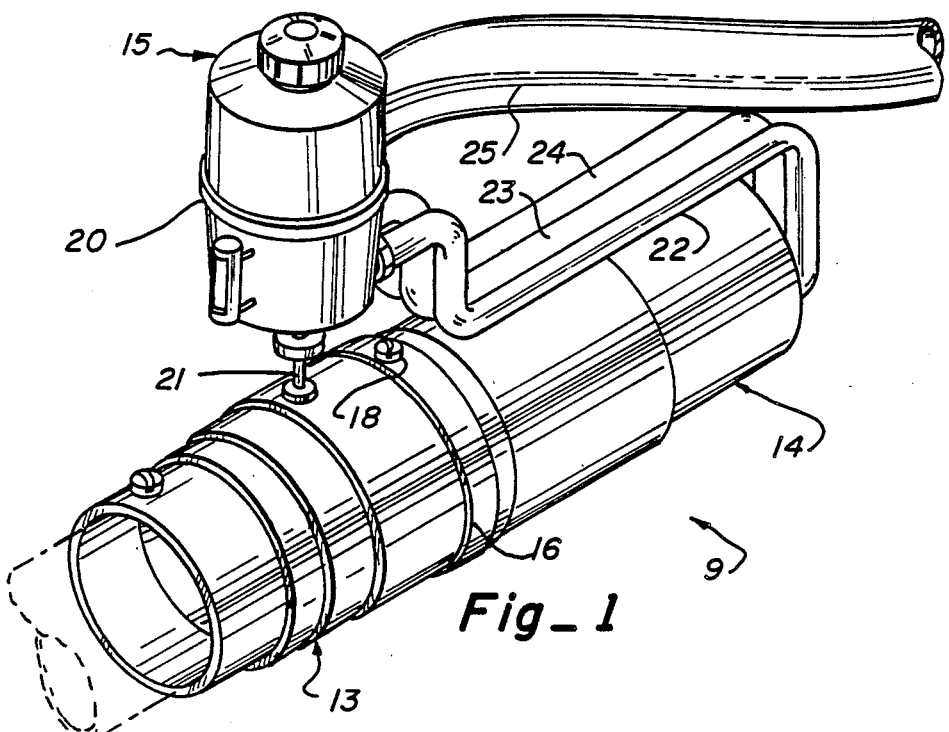
Fig_1
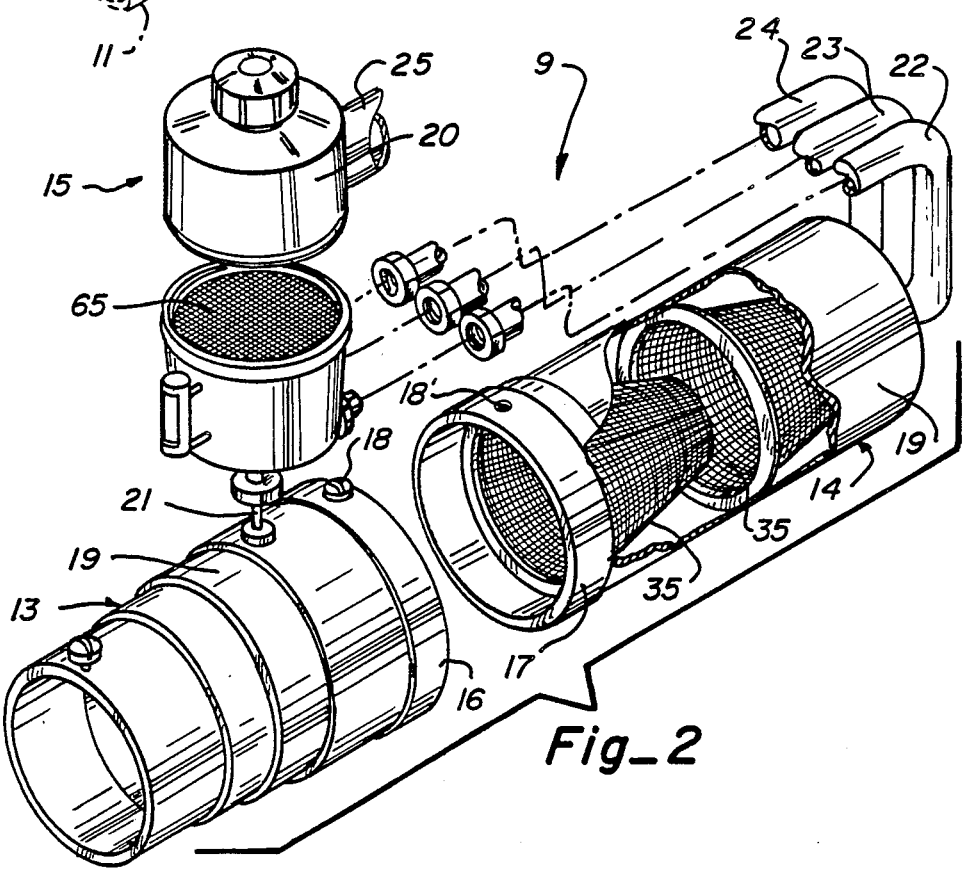
Fig_2

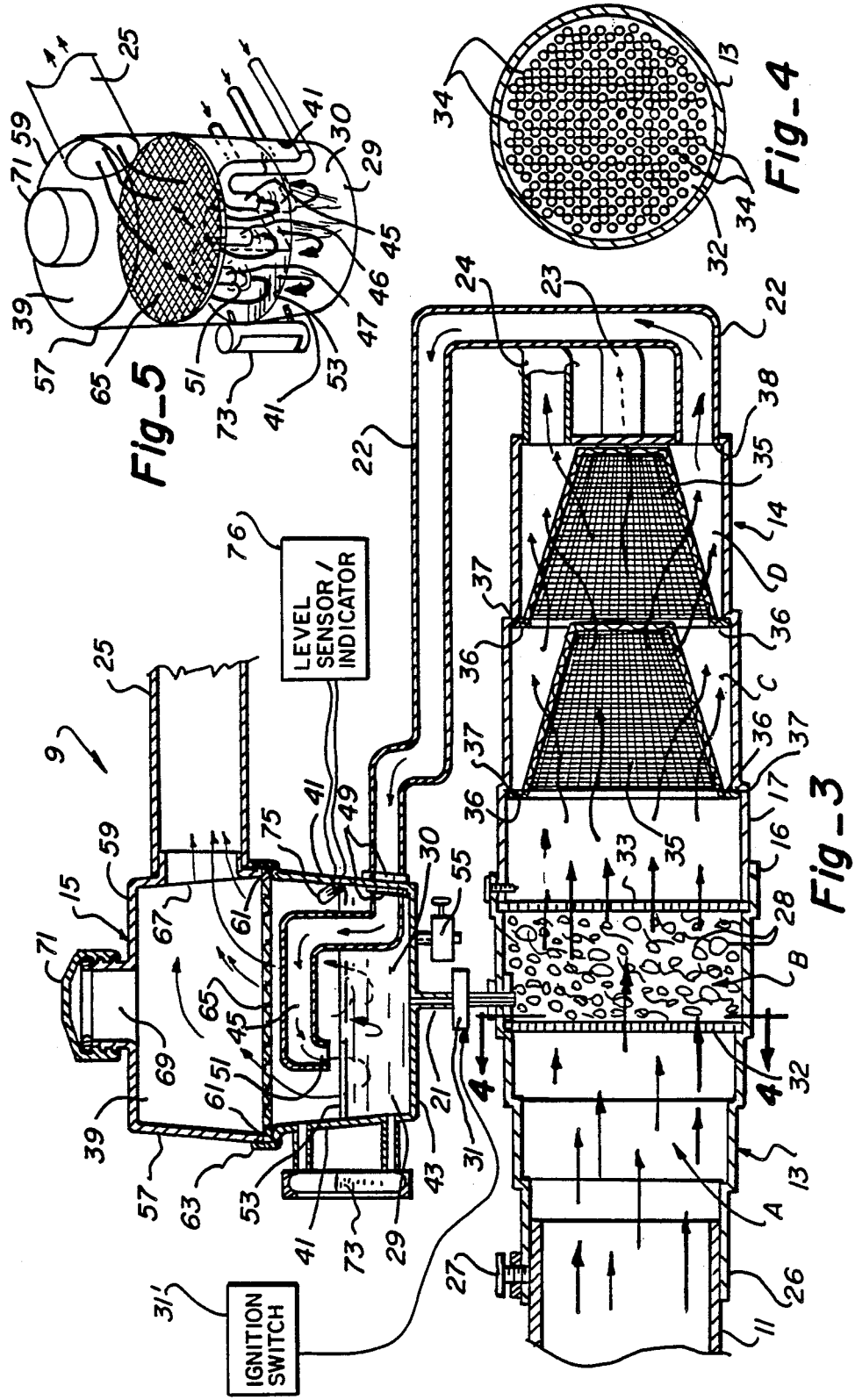

EXHAUST GAS PROCESSING DEVICE AND METHOD

FIELD OF THE INVENTION

This invention relates to exhaust gas cleaning and, more particularly, relates to a multi-chambered exhaust gas cleaning and noise muffling device for removing impurities including particulate matter from hot exhaust gas, normally air, and muffling operational noise, and further relates to a method for removing impurities from hot exhaust gas and muffling operational noise.

BACKGROUND OF THE INVENTION

Air pollution has become a major problem, and many devices for cleaning or purifying exhaust gas have heretofore been suggested and/or utilized. While such devices have been suggested and/or utilized, for example, to remove particulate matter from the exhaust emitted by an internal combustion engine and from smoke stacks and the like of industrial plants, such devices have met only limited success, have been unduly complicated and expensive for general use, have not been adapted for readily cleaning and/or replacing filter sections while retaining intact other portions of the device, have proven inefficient and/or produced inconsistent results, have required reconstruction of the combustion system to accommodate the air cleaning device, and/or have imposed undue restrictions on the combustion system so as to make the combustion system virtually inoperable in its intended manner.

In known cleaning devices it has been common to employ a liquid to cleanse the exhaust gas. In one such arrangement, shown in U.S. Pat. No. 3,448,562, issued June 10, 1969 to Wisting, and U.S. Pat. No. 4,137,715, issued Feb. 6, 1979 to Tung-lung et al., screens of liquid through which a gas stream must flow are provided as a wetting agent for removal of particulates from the gas.

In a second such arrangement a reservoir of water is provided into which exhaust gas is vented for mixing with the water, the particulate matter in the gas settling out while the lighter gaseous matter rises for emission (see, for example, U.S. Pat. Nos. 4,282,017, issued Aug. 4, 1981 to Chen, 1,716,481, issued July 13, 1927 to Bilsky, 4,300,924 issued Nov. 17, 1981 to Coyle, and 4,002,136, issued Jan. 11, 1977 to Michalak). U.S. Pat. Nos. 3,815,328, issued June 11, 1974 to Moss, and 3,824,769, issued July 23, 1974 to Santos et al., show a combination filtering system involving use of both venting of exhaust gas into a water-filled reservoir as well as passage of the gas through a filter media. U.S. Pat. Nos. 3,548,591, issued Sept. 11, 1968 to Mckay, and 2,787,119, issued Apr. 12, 1955 to Giambruno, show the use of wetted filters for removal of matter from gas, while U.S. Pat. Nos. 3,417,549 and 2,932,157, issued Aug. 21, 1967 to Leosis and Apr. 12, 1955 to Villasenor et al., respectively, show the use of various other fluid-treated filters for the capture of particulates in exhaust gas.

In a third such arrangement, water is brought into contact with elements heated by hot exhaust gas for vaporization thereof (see, U.S. Pat. Nos. 2,737,260, issued Mar. 6, 1956 to Jenison, and 4,578,091, issued Mar. 25, 1986 to Borja, inventor herein and upon which the application is in part based). In neither case, however, is the hot exhaust gas used to heat the water directly for subsequent vaporization thereof.

Arrangements are also shown whereby heat is transferred from a hot gas to a fluid by contact of the gas with the fluid, but wherein the heating of fluids appears to be incidental (see, for example, U.S. Pat. Nos. 3,541,761 and 3,274,752, issued on Nov. 24, 1979 to Pike and Sept. 27, 1966 to Huyghe et al., respectively).

As may be appreciated from the foregoing, while devices for cleaning or purifying exhaust air have heretofore been suggested and/or utilized which make use of fluids for cleansing the exhaust air, further improvements could nevertheless still be utilized.

SUMMARY OF THE INVENTION

This invention provides an improved exhaust gas processing device and method that is relatively simple yet dependable in removing particulate and other matter from hot exhaust air, provides for filter cleaning without requiring removal or replacement of other portions of the device, provides for heating of the liquid element of the device thereby enhancing efficiency of gas cleansing and counteracting freezing of the liquid.

It is an object of this invention to provide an improved exhaust gas processing devise and method.

It is another object of this invention to provide an improved air cleaning and noise muffling device and method for more effectively removing particulate and other matter from hot exhaust gas.

It is still another object of this invention to provide an improved air cleaning and noise muffling device and method for more effectively removing particulate and other matter from hot air exhausted from a combustion unit such as an internal combustion engine.

It is another object of this invention to provide an improved exhaust gas cleaning and noise muffling device having a plurality of filters for more efficient removal of particulate matter.

It is still another object of this invention to provide an improved exhaust gas cleaning and noise muffling devise for attachment to an exhaust gas outlet.

It is yet another object of this invention to provide an improved exhaust gas cleaning and noise muffling device having a first section for treating incoming exhaust gas to be cleaned with vapor to coagulate particulate matter, a second section for capturing particulate matter, and a third section including a liquid filled reservoir into which the exhaust gas and at least a portion of the exhaust gas carrying conduit are introduced for further cleansing of the exhaust gas and preheating of the liquid used for treating exhaust air in the first section.

With these and other objects in view, which will become apparent to one skilled in the art as the description proceeds, this invention resides in the novel construction combination, arrangement of parts and process substantially as hereinafter described, and more particularly defined by the appended claims, it being understood that changes in the precise embodiments of the herein disclosed invention are meant t be included as come within the scope of the claims.

BRIEF DESCRIPTION OF THE DRAWINGS

The accompanying drawings, together with the specification, illustrate a complete embodiment of the invention according to the best mode so far devised for the practical application of the principles thereof and in which:

FIG. 1 is a perspective view of an assembled device of this invention adapted for use in conjunction with a motor vehicle driven by an internal combustion engine to receive and remove impurities including particulate matter emitted during operation of the engine;

FIG. 2 is an exploded, partially cut away side perspective view similar to that of FIG. 1, showing portions of the device separated into a fixed, or retained, section and detachable sections, and further illustrating the configuration of one of the filter sections;

FIG. 3 is a cross sectional view of the device taken along section line 3—3 of FIG. 1 illustrating the chambers in each section;

FIG. 4 is a sectional view taken along section line 4—4 of FIG. 3 showing a typical barrier or screen between at least some of the chambers of the device as shown in FIGS. 1 through 3;

FIG. 5 is a schematic perspective view of the liquid supplying portion of the device as shown in FIGS. 1 through 3.

DESCRIPTION OF THE INVENTION

Exhaust gas processing device 9, shown in FIGS. 1 through 3, is particularly adapted for use in conjunction with an internal combustion engine, such as is commonly utilized to propel a motor vehicle, to remove particulate and/or other material emitted from the exhaust system of the vehicle while muffling engine operation noises. It is meant to be realized, however, that the exhaust gas to be cleaned could be from any type of combustion device having a pipe, such as a pipe 11 as indicated in FIGS. 1 and 3, through which exhaust gas is emitted. Such a device could include, for example, exhaust gas (normally air) from a gas, oil or coal combustion engine or gases from a stack or the like such as is normally found in an industrial plant (or even from the combustion plant used for home heating or the like).

As shown best in FIGS. 1 and 2, exhaust gas cleaning device 9 includes a front section 13, a rear section 14 and a top section 15, with front section 13 having a rearwardly extending cylindrical shoulder 16 which receives cylindrical shoulder 17 extending forwardly from rear section 14. When the front and rear sections are assembled, the sections are held together thereat in conventional fashion, as by threaded screw 18 received in threaded aperture 18' in shoulder 17.

As indicated in FIGS. 1 and 2, front and back sections 13 and 14 may be canisters having outer walls 19 with gradually reduced diameter sectional areas to facilitate dividing each section into chambers. Top section 15 includes normally closed canister 20, in communication with front section 13 through valved fluid conveying line 21 and rear section 14 through gas flow conduits 22 through 24 (which may be of either flexible or rigid material), and exhaust gas outlet conduit 25, herein a flexible conduit, for discharge of processed gas, normally air, into the environment. Pipe 11, gas flow conduits 22 through 24 and air outlet conduit 25 will ideally provide the same cross sectional area for passage of gas (in the case of conduits 22 through 24 the area referred to being the cumulative cross sections of the three individual conduits) thereby avoiding the excessive build up of back pressure in the system.

As shown best in FIG. 3, front section 13 can be conventionally secured to a motor vehicle (not shown) so that the intake 26 of the air cleaning device receives the end of the tail pipe 11 therein and is secured thereto, for example, by screw and lock nut assembly 27, in a substantially sealed relationship, the screw being received through a threaded aperture in intake 26 for clamping contact with pipe 11, and the lock nut being tightened to resist loosening of the screw due to operational vibrations.

As shown in FIG. 3, front section 13 includes two chambers designated A and B. Chamber A is a collecting chamber positioned immediately rearwardly of intake 26 and receives the hot exhaust air which is conducted rearwardly toward and into chamber B.

Chamber B is a treating, or steam, chamber used to coagulate particulate matter in hot exhaust gas. As indicated in FIG. 3, chamber B is filled with heat absorbing solid discrete particle material 28, preferably a combination of spherical and sharp-edged material such as $\frac{5}{8}''$ diameter marbles and aluminum shavings, for example, which is heated by hot exhaust gas passing through the treating chamber.

As also shown in FIG. 3, top section 15 includes reservoir 29 that contains a liquid (normally water) 30 with the reservoir being positioned above chamber B so that liquid in the reservoir can be discharged from the reservoir, for example by gravity flow, and be metered into chamber B through line 21 and valve 31, which valve may be an electrically operated valve conventionally connected with the ignition control 31' of a vehicle to meter the liquid into chamber B in any desired fashion (as, for example, by being proportional to time while the ignition is on).

In chamber B, the hot exhaust gas heats the solid material in the chamber creating a generally hot environment within the chamber thereby causing vaporization of the water introduced into the chamber from reservoir 29 through line 21 so that the chamber becomes, in effect, a steam chamber. Efficiency of vaporization, and so of the unit, may be enhanced if the liquid introduced into the chamber is nearer the vaporization point of the liquid when introduced as will be pointed out in more detail hereinbelow. The steam coagulates the particles of combustion (hydrocarbons and other materials) in the exhaust gas which enables the particles to be captured in the rear section 14 of the device.

As also indicated in FIG. 3, chamber B is divided from chamber A at the front end of the chamber and from rear section 14 at the back end of the chamber by means of dividers, or screens, 32 and 33, which, as best shown typically for divider 32 in FIG. 4, includes a plurality of apertures 34 in the divider to allow the flow of exhaust air through the chambers while maintaining particle material 28 in chamber B, the cumulative areas of apertures 34 being substantially equivalent to the cross section of pipe 11.

Rear section 14 of the device includes at least two filter chambers C and D. Filter chambers C and D are each provided with a basket-shaped filter 35 (as also shown in FIG. 2), the sides and bottom of which may be constructed, for example, of 100 mesh stainless steel cloth. Filters 35 are provided with a cylindrical lip 36 at the forward portions thereof for seating against annular ridges 37 of the respective filter chambers C and D. When exhaust gas is passing through chambers C and D, filers 35 are maintained as shown in FIG. 3 within rear section 14 of the device while the basket-shaped configuration of the filters deters substantial dislodging of the filters when the device is not in operation. Furthermore the shape of the filters as well as the material chosen in their construction serves to direct more of the gas flow to the center of the filters and, thereby, through the end portions thereof so that, while smaller openings through the filter may be provided for more complete filtering of particulate matter passing therethrough, filter blockage is less likely in periods between maintenance.

When assembled, the hot exhaust gas with the particulate matter therein discharged from front section 13 passes successively through filter chambers C and D wherein particulate matter is captured by the filter in each chamber and thus removed from the exhaust gas.

Chamber D is provided with rear end plate 38 from which gas flow conduits 22 through 24 extend, attached thereto by, for example, welding for passage of the filtered, hot exhaust gas directly from chamber D into the conduits. Gas flow conduits 22 through 24 may be of readily deformable tubing, for example, copper tubing, configured to direct the exhaust air to the lower portion of reservoir 29 of top section 15 as shown in FIG. 3.

As best shown in FIGS. 3 and 5, top section 15 includes reservoir 29 for containing a supply of liquid, herein water, 30, and upper collection chamber 39. Reservoir 29 is a cylindrical reservoir having tapered side wall 41 and a bottom portion 43 and includes heat conducting metallic (for example, copper) gas flow directing pipes 45 through 47 therein passing through side wall 41 at the lower portion of reservoir 29 below the level of water 30. Pipes 45 through 47 are maintained in side wall 41 by any suitable fitting, herein shown as double nut clamp 49, and sealed against fluid leakage (for example, with a silicon sealant or gasket). The water contacting portions of reservoir 29 may be coated with a corrosion resisting material to thereby increase the useful life of the reservoir.

As shown in FIG. 3 with respect to pipe 45, gas flow directing pipes 45 through 47 enter reservoir 29 below the liquid level and then are configured to rise above the level of liquid 30 in reservoir 29, and to ultimately direct their outlets 51 downward toward the surface 53 of the liquid. When connected to gas flow conduits 22 through 24 respectively (as, for example, by insertion of the exterior portion of pipe 45 into conduit 22 as shown in FIG. 3) pipes 45 through 47 direct the hot exhaust gas through the liquid 30 and then direct the exhaust gas downwardly toward the surface 53 of the liquid. Conduits 22 through 24 and pipes 45 through 47 are of sufficient cross sectional area to prevent the undue buildup of back pressure in the system. In this fashion heat is transferred from the hot exhaust gas to the liquid both directly and through the metallic pipes thereby providing counteraction to the potential for freezing of the liquid and preheating the liquid for more efficient vaporization upon its introduction into treating chamber B.

As shown in FIGS. 3 and 5, the downward projection of exhaust gas through outlets 51 of pipes 45 through 47 causes mixing at the surface 53 of liquid 30 and the exhaust gas, which results in a further cleansing, or washing, of the exhaust gas and/or separate of fumes and/or odors therefrom. Particulate matter remaining in the exhaust gas will be separated and settle to the bottom 43 of reservoir 29 where it may be periodically drained off with the liquid through drain valve 55. Drain valve 55 could usefully be constructed of a transparent material for viewing sediment buildup thereat thereby providing indication of the need to drain and refill the reservoir.

Upper collection chamber 39 is defined by cylindrical side wall 57 and top wall 59 and is connected to side wall 41 of reservoir 29 at lip 61 by, for example, clamps 63. Filter 65, separating chamber 39 from reservoir 29, is clamped therebetween for easy access and cleaning thereof and may be constructed of the same material used for filters 35. As the cleansed and cooled exhaust gas rises from liquid 30 it passes through filter 65, the filter collecting remaining impurities as well as excess moisture, and into chamber 39 for passage through outlet 67 into outlet conduit 25 and, ultimately, into the environment.

Chamber 39 includes refilling port 69 at top wall 59 thereof, port 69 having removable pressure cap 71 attachable thereto, for replenishment of the liquid in reservoir 29. Reservoir 29 may include indicator 73, and/or a sensor and remote indicator (herein a mercury switch 75 connectable to an indicator 76 which may, for example, be positioned in the cab of a motor vehicle) for indicating low levels of liquid in the reservoir and/or excessively dirty liquid. By this combination, maintenance of the liquid supply is made relatively simple.

In operation, for example on a motor vehicle having an internal combustion engine, device 9 is positioned with the tail pipe extending into the intake to the device. When the reservoir is filled with liquid, in this case water, and the ignition of the vehicle is turned on, water is metered into the treating chamber and, with the motor running, hot exhaust air is fed through the collecting chamber to the treating chamber where the water is vaporized and the resulting steam coagulates particulate matter in the exhaust air moving through the treating chamber. The exhaust air with the particulate matter therein then passes through the filter sections where particulate matter and/or other impurities are captured before passage of the exhaust air to the top section where the air is again treated by passage of the air through liquid. As the air is passed through the liquid, the liquid is heated thereby enhancing the efficiency of vaporization when the liquid is introduced into the treating chamber.

It is to be understood that the dimensions and shape of the exhaust gas cleaning device may be varied as needed or desired for a particular application. When used in association with motor vehicles having internal combustion engines the device also serves to muffle engine operation noises. The device, in such cases, while retrofitable, may be installed in place of the traditional muffling device. The top section of the device, including the reservoir, may be advantageously housed in the rear section of such vehicles, for example in the trunk of a conventional automobile. As may be appreciated, the device is readily disassembleable at the rear section and top section thereof for filter and fluid maintenance and/or replacement.

In view of the foregoing, it is to be appreciated that this invention provides an improved exhaust gas cleaning and noise muffling device and method that is particularly useful for cleaning hot exhaust gas having particulate and other material therein.

What is claimed is:

1. A method of treating hot exhaust gas before emission thereof into the environment, said method comprising:

collecting said hot exhaust gas;

heating solid discrete particle material with said hot exhaust gas;

directing said hot exhaust gas into contact with a supply of liquid so that turbulence in said supply of liquid is created to thereby enhance mixing of said hot exhaust gas and said liquid for cleansing purposes and to heat said liquid to a temperature nearer the vaporization point of said liquid;

causing said liquid to be directed toward said heated solid material to vaporize said liquid forming a steam and thereby coagulate particles of matter to be removed from said hot exhaust gas heating solid material;

removing said coagulated particles of matter from said vapor exposed exhaust gas by exposing said vapor exposed gas to a plurality of filters before directing said hot exhaust gas into contact with said supply of liquid; and filtering said gas after contact thereof with said supply of liquid and before emission thereof into the environment.

2. The method of claim 1 wherein said hot exhaust gas to be treated is produced by the internal combustion engine of a vehicle and all steps occur within the exhaust system of said vehicle whereby said gas emitted from said system is cleansed and operational noise is muffled.

3. The method of claim 1 wherein the step of directing said hot exhaust gas into contact with a supply of liquid includes contacting only the surface of said supply of liquid and additionally provides counteraction to freezing of said liquid.

4. A multi-chambered gas cleaning device, comprising:

treating section means for receiving and passing hot gas having particle impurities therein through said treating section means, said treating section means including heat absorbing solid discrete particle material therein so that said hot gas heats said solid material at said treating section means;

liquid supplying means including a reservoir section for maintaining liquid therein and means for introducing said liquid from said reservoir into said treating section means contiguous to said solid discrete particle material so that, when said gas received by said treating section means is at a sufficiently high temperature, said solid material is heated to cause said liquid to be vaporized forming a steam to thereby coagulate particle impurities in said hot gas exposed thereto to make said impurities more readily separable from said hot gas;

filtering means for receiving said treated gas from said treating section means and removing said more readily separable impurities as said gas is passed therethrough, said filtering means including a plurality of filters at least one of which is a basket shaped filter of stainless steel mesh material and each of which successively receives said treated hot gas;

first gas flow directing means for receiving said filtered gas from said filtering means and directing the same into contact with said liquid in said reservoir section of said liquid supply means so that said gas is further cleansed and wherein said liquid being introduced into said treating section means is preheated;

second gas flow directing means connected to said reservoir section of said liquid supply means for conducting said gas therethrough for discharge purposes; and a filtering section positioned at said liquid supplying means for passing said gas therethrough to said second gas flow directing means.

5. The device of claim 4 wherein said filtering means and said filtering section are removably secured to said treating section means and said liquid supplying means respectively, and wherein said filtering means and said filtering section are accessible for cleaning.

6. The device of claim 4 wherein said device is attached to the exhaust system of a vehicle to clean hot exhaust air emitted from said exhaust system and to muffle operational noise.

7. The device of claim 4 wherein said gas flow directing means comprises three discrete gas flow conduits, said three discrete gas flow conduits passing through said liquid in said reservoir before delivering said gas to three different locations for contact with said liquid in said reservoir section of said liquid supply means to thereby enhance mixing of said gas and said liquid and heating of said liquid.

8. The device of claim 4 wherein said filtering means includes a cylindrical filter housing having at least one circumferential shoulder at the interior thereof, and wherein said basket-shaped filter includes an open end having an annular lip extending away from said opening at the edge thereof, said lip being configured to contact said shoulder for maintaining said basket-shaped filter in said cylindrical filter housing.

9. The device of claim 4 wherein said fluid supplying means includes electrical metering means for metering the flow of said fluid to said treating section means.

10. A multi-chambered air cleansing and muffling device for removing impurities from hot exhaust gas emitted by the internal combustion engine of a motor vehicle and muffling operational noises, said device comprising:

a first section including a collecting chamber, positioned to receive substantially all of said hot exhaust gas emitted from said internal combustion engine and treating chamber means, connected with said collecting chamber to receive and pass said hot exhaust gas therethrough, said treating chamber means having therein at least one of heat absorbing spherical and sharp-edged solid discrete particle material extending across the path of the treating chamber means for contacting said hot exhaust gas and being heated thereby, said treating chamber means also having means for introducing water within said treating chamber means contiguous with said discrete particle material with said water being vaporized thus forming a steam to coagulate particles of matter in said hot exhaust gas exposed thereto while passing through said treating chamber means;

a second section secured to said first section to received treated gas emitted from said treating chamber means, said second section including at least one basket-shaped filter receiving and passing said treated gas therethrough, said filter capturing said coagulated particles of matter in said gas passing through said filter;

reservoir means for containing a supply of said water and connected with said means for introducing water and with said second section so that said filtered gas is directed into contact with said water in said reservoir means thereby creating turbulence in said water to enhance mixing of said filtered gas and said water resulting in further cleansing of said gas and heating of said water; and a third section secured to said reservoir means to receive said cleansed gas emitted from said reservoir means, said third section including at least one filter receiving and passing said cleansed gas therethrough before emission of said gas into the environment.

11. The device of claim 10 wherein said reservoir means includes draining and refilling ports for replenishing said supply of said water.

12. The device of claim 11 wherein said reservoir means includes indicator means for indicating both water level and cleanliness.

13. The device of claim 10 wherein said filters are stainless steel cloth-type material.

14. The device of claim 10 wherein said third section includes a flexible gas outlet conduit for directing said gas to a discharge position with respect to said motor vehicle.

15. The device of claim 10 wherein said motor vehicle includes an electronic ignition and wherein said reservoir means includes electronic metering means also connected with said electronic ignition for metering the flow of said water to said treating chamber means when said electronic ignition is activated and causing said flow to cease when said electronic ignition is deactivated.

16. The device of claim 10 wherein said reservoir means includes sensing means having remote indicator means within said motor vehicle for sensing the level of said water in said reservoir means and indicating said level at said remote indicator means.

* * * * *